Reissued Oct. 30, 1934

Re. 19,354

UNITED STATES PATENT OFFICE 19,354

PHOTOGRAPHIC BATH

Felix A. Elliott, New York, N. Y., assignor to Eastman Kodak Company, Rochester, N. Y., a corporation of New York No Drawing. Original No. 1,411,687, dated April 4, 1922, Serial No. 460,995, April 13, 1921. Application for reissue July 13, 1934, Serial No. 735,050

6 Claims. (Cl. 95—88)

This invention relates to photographic baths and more particularly to acid fixing baths.

It is well known that solutions of sodium thiosulfate, used for the removal from photographic emulsions of undeveloped silver salts, should be acidified. Alum is generally added to the fixing bath for the purpose of hardening the gelatine, and if the bath is or becomes alkaline, or too weakly acid, there is a tendency for aluminum compounds to precipitate alumina or aluminum salts. On the other hand, if the bath is too acid, sulfur is precipitated from the sodium thiosulfate. It is necessary, however, to have enough acid present to neutralize the considerable amounts of alkali brought over from the developer.

In an attempt to satisfy these requirements, organic acids are generally used because they are but slightly dissociated in solution and hence render the bath sufficiently acid, while since the total amount of alkali which can be neutralized depends on the total amount of acid present, the undissociated acid acts as a reserve from which the acidity, that is the hydrogen ion concentration, of the bath is replenished or maintained with gradually decreasing strength until the acidity of the bath becomes less than is desirable.

The amounts of these organic acids that can be added, however, are not sufficient to maintain the acidity of the bath within the desired limits during the life of the bath and it is necessary either to add acid or discard the bath.

I have discovered that the acidity of such a bath may be maintained within the desired limits for the full life of the bath by the "buffer action" of certain substances in solution. By the full life of the bath I mean until the sodium thiosulfate is exhausted. By "buffer action" is meant the ability of a solution to resist change in its hydrogen ion concentration through the addition or loss of acid or alkali. The unit by which hydrogen ion concentration is measured is defined as represented by the symbol pH or $P_H$. I have here adopted the former symbol consistently with its use in the Journal of Biological Chemistry. Full explanation of the theory underlying the "buffer action" referred to above is contained in the literature, and it is unnecessary here to review it. Reference is made particularly to the comparatively simple explanation found in "The Determination of Hydrogen Ions" by Clark, published 1920, by the Williams and Wilkins Company, Baltimore, Maryland, and to the extensive bibliography contained therein.

For a neutral solution, the expression pH=7 is approximately correct, and it has been found that the fixing bath should have an acidity or hydrogen ion concentration not greater than pH=4 and not less than pH=6.5 or, preferably, pH=6. It is possible by applying known ionization formulæ to compute the required amount of suitable buffers, that is substances capable by dissociation in accordance with the law of mass action of maintaining the acidity of the fixing bath within the desired limits. The weaker acids, that is, ones which are but partially dissociated in solution, such as the organic acids, for instance acetic acid, citric acid, formic acid and others, have been found to be admirably adapted for use in such a bath. As the buffer material, I have found particularly useful the salts of the alkali metals (including ammonium) of the acid used. Thus, acetic acid and sodium acetate, or citric acid and sodium citrate or any weak acid such as those mentioned above with alkali metal salts of such acids may be used together with satisfactory results. The buffer material, by which, as previously stated, I mean any substance which can be added to a fixing bath containing sodium thiosulfate and which maintains the hydrogen ion concentration of the bath at a predetermined value for the useful life of the bath, may be an acid salt such as sodium dihydrogen phosphate, for example. While disodium hydrogen phosphate would be unsuitable in baths containing insufficient or only a slight amount of acid, it may be used in acid fixing baths such as I have described. Boric acid can also be used as an ingredient of such baths in combination with acids of the type of those just mentioned, for example, acetic acid.

The following formula is a typical one embodying my invention:

| | | |
|---|---|---|
| Sodium thiosulfate | 300 | grams |
| Sodium sulfite | 50 | grams |
| Acetic acid (glacial) | 2.4 | grams |
| Sodium acetate | 10.5 | grams |
| Water to | 1 | liter |

If desired there may be added a suitable hardener such as potash alum, 60 grams.

Another formula is:

| | | |
|---|---|---|
| Sodium thiosulfate | 100 | grams |
| Sodium sulfite | 20 | grams |
| Citric acid | 4 | grams |
| Sodium citrate | 6 | grams |
| Water | 600 | cc. |

to which may be added a suitable hardener.

While I have endeavored to point out the principles of my invention and to give preferred examples thereof, it is to be understood that there is possible a wide range of equivalents, the use of which I contemplate as within the scope of my invention as defined in the appended claims.

When in the claims I refer to the hydrogen ion concentration being maintained at a predetermined strength, I do not mean that it is maintained precisely constant during the entire life of the bath, but that it is maintained within certain reasonably narrow limits, at a value such that the bath is useful.

What I claim is:

1. A photographic fixing bath comprising in aqueous solution, sodium thiosulfate, an aliphatic organic acid, and a salt of an aliphatic organic acid in addition to salts formed in the solution by interaction of any of its ingredients, said salt being capable of maintaining, and present in sufficient concentration as to maintain the hydrogen ion concentration of the bath at a predetermined value by dissociation for the useful life of the bath.

2. A photographic fixing bath comprising in aqueous solution, sodium thiosulfate, sodium sulfite, an aliphatic organic acid and a salt of an aliphatic organic acid in addition to salts formed in the solution by inter-action of any of its ingredients, said salt being capable of maintaining, and present in sufficient concentration as to maintain the hydrogen ion concentration of the bath at a predetermined strength by dissociation for the useful life of the bath.

3. A photographic fixing bath comprising in aqueous solution, sodium thiosulfate, sodium sulfite, acetic acid, and a salt of an aliphatic organic acid in addition to that formed by inter-action between the sodium sulfite and the acetic acid, said salt being capable of maintaining, and present in sufficient concentration as to maintain the hydrogen ion concentration of the bath at a predetermined strength by dissociation for the useful life of the bath.

4. A photographic fixing bath comprising in aqueous solution, sodium thiosulfate, sodium sulfite, acetic acid, and an alkali metal salt of said acid in addition to that formed by interaction between the sodium sulfite and the acetic acid, said salt being capable of maintaining, and present in sufficient concentration as to maintain the hydrogen ion concentration of the bath between pH=4 and pH=6.5 by dissociation for the useful life of the bath.

5. An acid hardening fixing bath comprising in aqueous solution, sodium thiosulfate, sodium sulfite, potassium alum, an aliphatic organic acid, and a salt of an aliphatic organic acid in addition to salts formed by interaction between ingredients of the bath, said salt being present in sufficient concentration to maintain the hydrogen ion concentration of the bath at a predetermined value for the useful life of the bath.

6. An acid hardening fixing bath comprising in aqueous solution, sodium thiosulfate, sodium sulfite, potassium alum, an aliphatic organic acid, and a salt of an aliphatic organic acid in addition to salts formed by interaction between ingredients of the bath, said salt being capable of maintaining, and present in sufficient concentration as to maintain the hydrogen ion concentration of the bath within the range pH=4 and pH=6.5 by dissociation for the useful life of the bath.

FELIX A. ELLIOTT.